United States Patent [19]
Puterbaugh

[11] 3,904,721
[45] Sept. 9, 1975

[54] METHOD OF ASSEMBLING A REFRIGERATION CABINET

[75] Inventor: Richard L. Puterbaugh, St. Cloud, Minn.

[73] Assignee: Franklin Manufacturing Company, St. Cloud, Minn.

[22] Filed: Nov. 11, 1974

[21] Appl. No.: 522,781

Related U.S. Application Data

[62] Division of Ser. No. 366,752, June 4, 1973, abandoned.

[52] U.S. Cl. .......... 264/46.5; 29/157.3 R; 29/527.1; 29/DIG. 29; 264/46.7; 264/275; 312/214
[51] Int. Cl.² ........................................ B29D 31/00
[58] Field of Search ..... 29/157.3 C, 157.3 R, 527.1, 29/DIG. 29; 156/79; 264/45.1, 46.4, 46.5, 46.7; 312/214

[56] References Cited
UNITED STATES PATENTS

| | | | |
|---|---|---|---|
| 2,576,208 | 11/1951 | Benson | 312/214 UX |
| 2,622,753 | 12/1952 | Philipp | 312/214 X |
| 2,675,937 | 4/1954 | Philipp | 312/214 UX |
| 2,795,035 | 6/1957 | Kafer | 113/118 R X |
| 2,869,336 | 1/1959 | Smidl et al. | 159/79 X |
| 3,042,137 | 7/1962 | Mathues et al. | 264/46.6 X |
| 3,152,199 | 10/1964 | Roberts | 264/46.5 |
| 3,221,085 | 11/1965 | Rill et al. | 264/46.5 |
| 3,429,085 | 2/1969 | Stillman | 264/46.4 X |
| 3,459,628 | 8/1969 | Dixon et al. | 264/46.5 X |
| 3,498,371 | 3/1970 | Zygiel | 29/DIG. 1 |
| 3,799,831 | 3/1974 | Griffiths | 156/297 |

FOREIGN PATENTS OR APPLICATIONS

451,623  9/1949  Italy ................................... 312/214

*Primary Examiner*—C. W. Lanham
*Assistant Examiner*—D. C. Reiley, III
*Attorney, Agent, or Firm*—McNenny, Farrington, Pearne & Gordon

[57] ABSTRACT

A method of constructing a refrigeration cabinet wherein a tubing coil is releasably held against a prefinished inner liner, a layer of insulating polyurethane foam is applied to permanently secure the tubing in place, then the subassembly is positioned in an outer cabinet shell, and finally the volume between the shell and the subassembly is filled with a second layer of insulating polyurethane foam.

9 Claims, 3 Drawing Figures

PATENTED SEP 9 1975　　　　　　　　　3,904,721

METHOD OF ASSEMBLING A REFRIGERATION CABINET

This is a division of application Ser. No. 366,752 filed June 4, 1973, now abandoned.

BACKGROUND OF THE INVENTION

The invention relates to an improved refrigeration cabinet construction and more specifically, pertains to assembly of refrigeration tubing to refrigeration cabinet walls.

PRIOR ART

In refrigeration apparatus such as freezer cabinets, refrigerant tubing is commonly arranged in heat exchange relationship with various walls of the apparatus. Among the prior methods of securing or otherwise maintaining the tubing and walls in a desired relationship, the most common has been the use of mechanical clips or brackets formed or fastened on the cabinet walls. Mechanical tube fastening means of this type usually requires some labor in its fabrication and separate assembly on the wall portions prior to or during assembly of the tubing on the wall. Further, such mechanical tube fastening means has generally not been compatible with the use of prefinished wall panels. Provision of such mechanical fastening means usually involves some operation which disturbs the prefinished coating. For example, spot welding usually cannot be accomplished without burning adjacent areas of the prefinished coating. The term "prefinished" as used here describes a panel or sheet which, prior to fabrication or assembly into a cabinet wall, is painted or otherwise coated with a protective material layer visible in the finished product. Another disadvantage associated with such mechanical tube fastening means is the labor involved in positioning individual coils of the tubing in the fastening means at critical points.

Various alternatives have been proposed to eliminate the use of the mechanical brackets or clips. These alternatives have included the use of adhesive materials disposed between the tubing and cabinet walls, such as shown in U.S. Pat. No. 2,795,035. Another approach is disclosed in U.S. Pat. application Ser. No. 203,590, filed Dec. 1, 1971, now U.S. Pat. No. 3,799,831, where refrigerant tubing is held to the cabinet walls by coating these members with bitumen after they have been held together magnetically.

SUMMARY OF THE INVENTION

The invention provides a method of assembling refrigeration tubing to wall panels with a medium which serves the dual purposes of securing the tubing on the panels and insulating the resulting assembly from adjacent zones. In the disclosed embodiment, the tube securing and insulating medium is a rigid foam expanded in place over appropriate areas of the cabinet walls and tubing coils. The foam is preferably a polyurethane applied by spraying a mixture of liquid components on the panel and tubing. The liquid components are highly catalyzed to produce a foaming reaction quick enough to permit the walls to be successfully coated in a vertical orientation and at practical production rates. The tubing is initially arranged on the panel walls and a thermal mastic is applied adjacent the area of contact between the tubing and walls. The tubing is preferably formed of steel, and is temporarily held in line contact with the cabinet walls by a magnetic fixture. The foam medium is allowed to set and the magnetic fixture is subsequently removed.

The foam medium is provided with sufficient density and rigidity to hold individual tubing coils at substantially the same position as that maintained by the magnetic fixture. Any slight variance or drawing away of the tubing from its initial magnetically held position is accommodated by the heat conducting mastic to assure high thermal conductivity between the tubing and panel. The securing and insulating medium avoids the need for clips or other mechanical fastening means, and is compatible with the use of prefinished wall panels.

As disclosed, the wall panels to which the refrigeration tubing is secured form an inner liner of a refrigeration cabinet. This inner liner subassembly is adapted to be arranged within outer casing walls of the refrigeration cabinet. A zone between the liner subassembly and the outer casing may be subsequently filled with an insulating foam of substantially less density than that originally used in the formation of the liner subassembly. This second body of foam is preferably again a polyurethane material which is chemically compatible with the first foamed material. The second foam material when expanded in place is confined by the external casing walls and cooperates with the original foam material to press the tubing into substantially full contact with the inner liner walls as it expands.

DESCRIPTION OF THE PREFERRED EMBODIMENT

Figure 1:
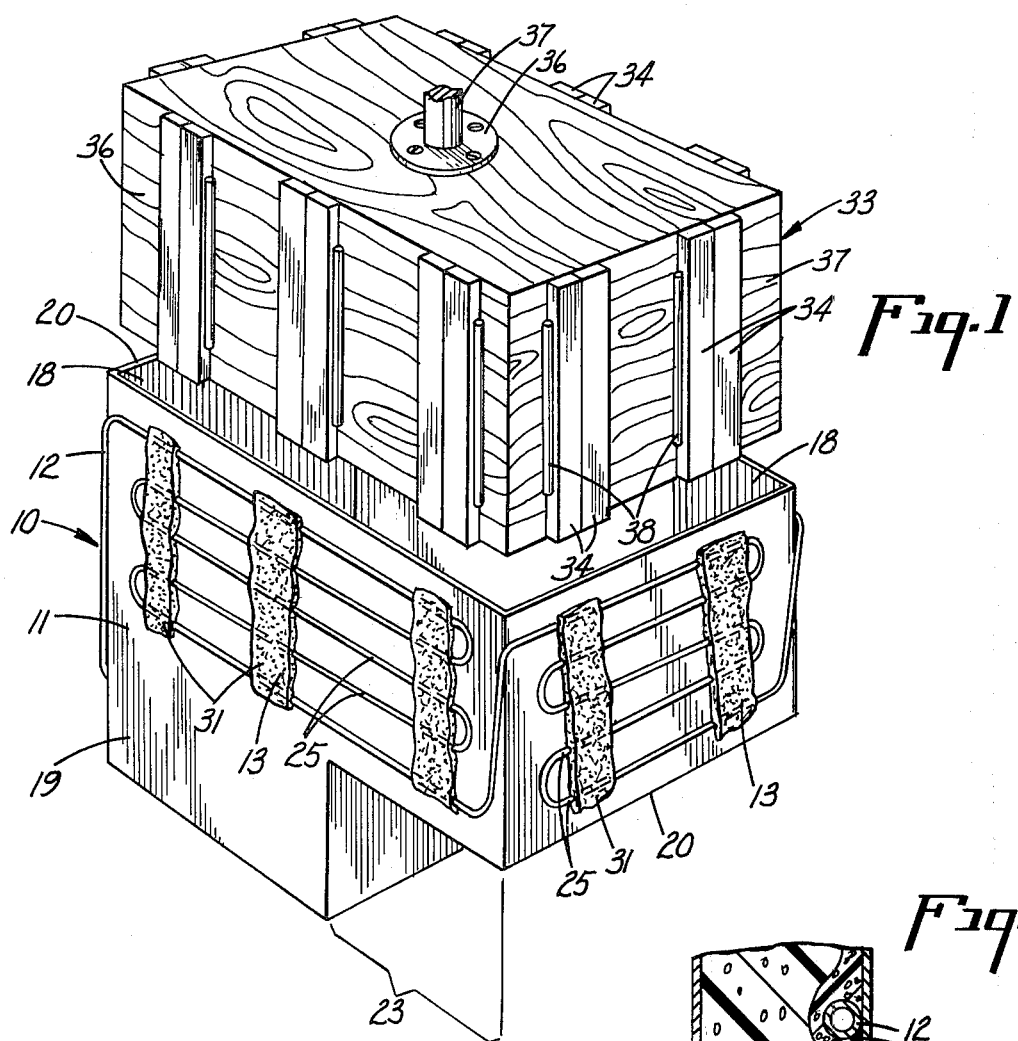
FIG. 1 is a perspective view of a refrigeration wall subassembly and a magnetic fixture for temporarily holding elements of the subassembly in position relative to one another during its manufacture.
Figure 3:
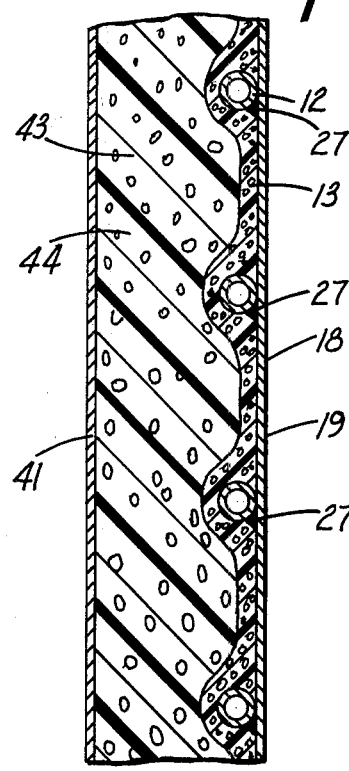
FIG. 3 is a cross sectional area of a wall of the refrigeration cabinet taken along the line 3—3 indicated in FIG. 2.

A refrigeration cabinet subassembly 10 illustrated in FIG. 1 includes a box-like liner 11, refrigeration evaporator tubing 12, and a tube securing and insulating medium 13. The liner 11 forms the inner walls of a refrigeration cabinet 16, as illustrated in FIG. 3, for service, e.g., as a domestic chest type food freezer. The liner comprises a pair of opposed sidewalls 19, a pair of opposed end walls 20 orthogonal to the sidewalls, and a bottom wall (not shown). The liner 11 departs from the form of a rectangular parallelopiped at a recess 23 adapted to receive a compressor (not shown). The liner 11 preferably is formed of sheet stock material, such as aluminum or other sheet metal. This sheet stock is, ideally, prefinished on at least one side with a coating of paint or other protective material, such as vinyl, of pleasant appearance. The prefinished sides of the liner stock are arranged to form inside surfaces 18 of the liner, visible after the refrigeration cabinet 16 is completed.

The use of prefinished sheet stock in construction of the liner 11 offers many advantages over the use of materials which must be painted or otherwise coated after fabrication into the liner. Flat stock may be more uniformly coated at less overall expense than a three-dimensional object of equal surface area. For example, sheet stock may be prefinished in a continuous, horizontal rolling operation in which a uniform coating may be applied across the roll width without the risk of incurring coating runs due to excessive deposits of material, as often occurs in the painting of vertical sides of three-dimensional objects. The result is that the inside surfaces 18 of the liner are uniformly coated from corner to corner without an objectionable excess or deficiency of coating material in such corners or elsewhere. The prefinished sheet stock is fabricated into the box-like liner 11 by bending up or otherwise arranging one or more pieces of the stock into the desired box-like structure, in accordance with sheet fabricating methods familiar to those skilled in the art. In this regard, the method selected should not require perforation of an inner wall surface 18, for obvious reasons of appearance.

The evaporator tubing 12 preferably comprises a continuous length of round tubing bent into a series of planar coils 25 proportioned to fit on each liner wall or panel 19 and 20. For the purposes of economy and for advantages in its assembly on the liner, discussed below, the evaporator tubing 12 is formed of steel. A heat conducting thermal mastic 27 is provided in the interstices formed between the liner walls 19 and 20 and tubing 12. The mastic material 27 is provided to optimize the heat conduction between the tubing 12 and liner walls 19, 20. A sample of a suitable mastic is disclosed in U.S. Pat. No. 3,442,094. Another example of a suitable mastic material is that produced by Electro Cote Co., of Minneapolis, Minnesota, U.S.A., designated as Product No. 207. This latter material has a minimum conductivity of 5.5 BTU per inch, per degree F., per hour, tested with a standard Cenco-Fitch apparator and a consistency of 45 to 55 seconds rheometer, 40 psi 20 grams, .104 orifice.

The tube securing and insulating medium 13 is provided in the form of a rigid foam which is applied over the tubing coils 25 and underlying sections of each wall 19 and 20 in separate strips or areas 31. A suitable foam material for this application is a two-liquid component system such as that produced by PPG Industries, Inc., of Pittsburgh, Pennsylvania, under the trademark "SELECTROFOAM" 6409-65018, having the following properties when applied to a metal sheet at 75° F. to a thickness of 1 inch. The properties are determined from cut test specimens without skins.

TABLE I

| | |
|---|---|
| Density, ASTM D-1622 | |
| (Overall, applied, lbs. per cubic ft.) | 4.5 – 5.0 |
| Closed cell content, ASTM D-2856 - (per cent) | 90 |
| Compressive strength, ASTM D-1621 | |
| (10% deflection, psi) | 70 |
| (5.3% deflection [yield], psi) | 64 |
| Tensile strength, ASTM D-1623 (psi) | 90 |
| Shear strength, ASTM D-732 (psi) | 63 |
| Thermal conductivity, ASTM C-518 | |
| (Initial) | 0.13 |
| (Design - aged) | 0.16 |

A magnetic fixture or jig 33 is provided for temporarily holding the tubing 12 against the liner walls 19 and 20 during application of the foam medium 13. The fixture 33 is dimensioned to fit within the liner 11. The magnetic fixture 33 includes a plurality of electromagnets 34 peripherally arranged on associated sides 36 and 37 of the fixture corresponding to the respective liner walls 19 and 20. A flange 36 and piston rod 37 are fixed to the fixture 33 and provide, by means of an air cylinder or similar device, for vertical movement in and out of the liner 11. A plurality of electric heater elements 38 are provided at spaced points on the exterior of the fixture 33 adjacent the electromagnets 34. The heater elements heat the liner walls 19 and 20 to a temperature above ambient room temperature, for example, 110° F., to maximize adhesion of the foam 13 to the liner walls.

In forming the liner subassembly 10, the tubing 12 is loosely arranged around the liner 11 and the electromagnets 34 are energized to draw the tubing 12 against the liner walls 19 and 20. Ideally, the magnets 34 have sufficient strength to draw the steel tubing 12 into substantially full line contact longitudinally along each coil 25. As explained below, the thermal mastic is preferably then applied with a suitable gun or nozzle adjacent the line of contact between each tubing coil 25 and the liner 11 in the interstices formed on the lower side of the tubing (FIG. 3).

Simultaneously with the action of the magnets, the heating elements 38 are controlled to elevate the temperature of the liner walls 19, 20. As shown, the heater elements 38 transmit heat by both conduction through the faces of the magnets 34 and radiation to the liner walls 19 and 20. Ideally, the tubing coils 25 are then covered with the individual strips 31 of foam 13. The foam 13 preferably is sprayed by mixing its liquid components in a suitable spray gun in a conventional manner. Limiting coverage of the securing and insulating foam medium 13 to spaced strips 31 minimizes spray-up time and the amount of high density foam material used. It is contemplated that substantially all of the tubing 12 may be covered by the foam 13 where it is desired to realize the full potential of the foam in securing the tubing 12 to the liner 11.

As indicated in the foregoing Table I, the composites of the foam 13 are highly catalyzed and reactive to produce an extremely fast set time of approximately 18 seconds, such that the walls 19, 20 may be sprayed in a vertical orientation without excessive running off of the liquid components before the solidification period. Once the foam 13 has set, it has sufficient adhesive qualities, characteristic of urethane foam, to retain its position on the liner walls 19 and 20. The foam 13 is also selected to have sufficient strength, owing to its density and rigidity, to permanently resist movement of the tubing coils 25 out of contact or heat conducting relationship with the liner walls. The foam 13 holds the tubing 12 exclusively without the use of brackets or clips or other fastening means which would disturb the appearance of the visible prefinished surfaces 18. Movement might otherwise result from original deviations or variations in flatness and perpendicularity of the tubing coils 25 and/or liner walls 19 and 20. Once the foam has set sufficiently, the electromagnets 34 are deenergized and the magnetic fixture 33 is removed from the liner subassembly 10.

Figure 2:
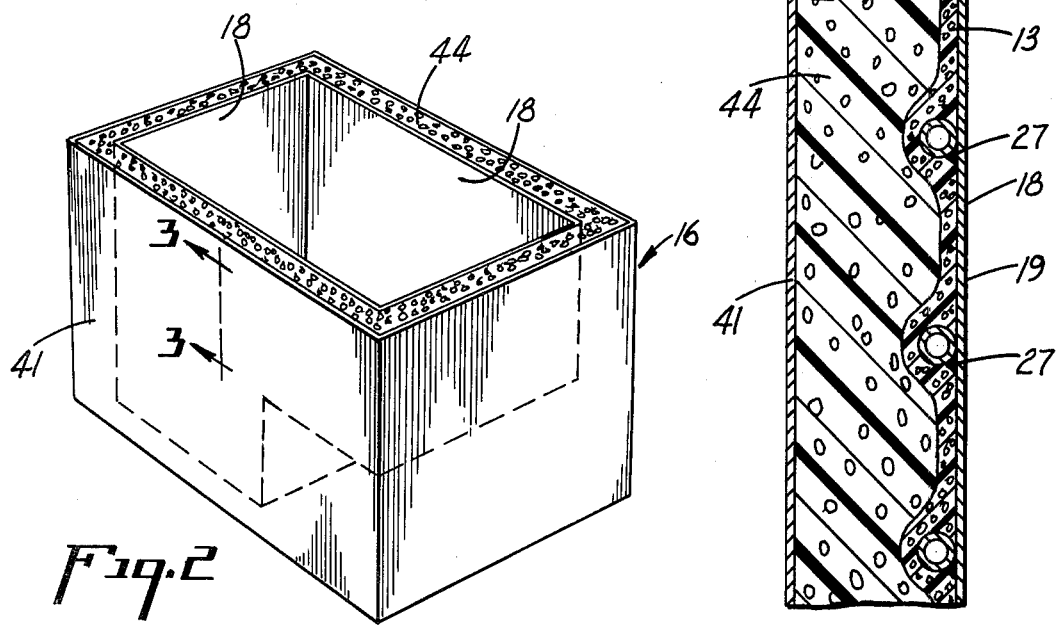
FIG. 2 is a perspective view of a refrigeration cabinet comprising the subassembly of FIG. 1 and an exterior casing.

The subassembly 10 may thereafter be joined with an outer shell or casing 41 of the refrigeration cabinet 16 (FIG. 2). The outer shell 41, like the inner lining 11, is formed of rigid sheet material, preferably of steel or aluminum, and is somewhat larger in its dimensions than the liner 11 so as to provide a space 43 surrounding all of the outer surfaces of the liner assembly 10. A second insulating medium 44 is disposed in this space 43. Preferably, this second medium 44 is provided as a rigid urethane foam of a common composition having adequate insulative qualities at least in the order of that of the high density foam 13, and is poured and foamed in place according to conventional current practices. The shell 41 and liner 11 are preferably arranged right side up, as illustrated in FIG. 2, during introduction and foaming of the second foam 44. The rising foam is blocked from movement into the interstices on the underside of the tubing coils 25 by the mastic 27. Migration of insulating foam into these areas between the tubing 12 and liner 11 would otherwise seriously limit heat conduction between these elements. Because of upward movement of the foam during the foaming process, there is no significant tendency of the foam 44 to move into the interstices at the upper sides of the coils 25 and, consequently, it is not necessary to fill these zones with thermal mastic.

Foaming or expansion of this second foam 44, restricted by the walls of the shell 41, produces pressure on the foam strips 31 securing the tubing 12 to the liner 11, and thereby assures that any relaxation of the latter foam and tubing away from the liner is corrected and substantially full contact of the tubing and liner is maintained. The second foam 44 preferably has a density of approximately 1.5 to 2.0 pounds per cubic foot, for example, and is substantially less dense than the tube securing and insulating foam 13. This second foam layer 44 fills a volume between the inner liner 11 and shell 41 substantially greater than that occupied by the first foam medium 13. In one embodiment, by way of example, the tube securing and insulating foam medium 13 is applied in a foamed layer thickness of approximately three eighths to one half inch, while the spacing between the liner 11 and shell 41 is nominally 1 11/16 inches. For best results, the foams 13 and 44 are selected for chemical compatibility to one another, and the second foam 44 is introduced to the first foam before the latter has cured to any significant extent. Both of the foams 13 and 44, except for normal variations at their outer surfaces or skins, generally have uniform densities throughout their respective volumes.

It is to be understood that the foregoing description of the preferred embodiment of this invention is not intended to be limiting or restricting, and that various rearrangements and modifications which may become apparent to those skilled in the art may be resorted to without departing from the scope of the invention as defined in the claims.

What is claimed is:

1. A method of assembling a refrigeration cabinet comprising the steps of positioning interconnected lengths of evaporator tubing on a side of an inner cabinet liner, foaming a layer of insulating foam in place on the evaporator tubing and outer surface of the liner with sufficient strength, adhesion, and area to hold the tubing to the outer liner surface, positioning the assembly of the tubing, liner, and first layer of foam in a shell forming the outer surface of the cabinet, and foaming a second layer of insulating foam between the first foam layer and the shell to fill and thereby heat insulate the space between said liner and said shell not occupied by said first layer and said tubing.

2. A method as set forth in claim 1, wherein said first foam layer is applied by spraying its components in a highly catalyzed state in comparison to the reactive state of said second layer whereby said tubing is secured to said liner by said first foam layer in a time period substantially less than the time period required for foaming said second layer.

3. A method as set forth in claim 2, wherein said first layer is applied in strips over said tubing and said liner.

4. A method as set forth in claim 1, wherein said first foam layer is provided in a first density selected to provide sufficient strength to maintain said tubing on said liner without additional holding means and said second foam layer is provided in a second density substantially less than said first density.

5. A method of assembling a refrigeration cabinet comprising the steps of providing a box-like inner liner and a tubing coil formed to fit on a plurality of sides of the liner, assembling the tubing against the liner with a releasable holding force such that the tubing is forced into direct contact with the liner walls, applying heat conductive thermal mastic adjacent the area of contact between the tubing and liner walls, applying a coating of insulating foam over sections of the liner walls engaged by said tubing with a density and rigidity sufficient to permanently hold said tubing in place on the liner, positioning the subassembly of the liner and tubing in an outer cabinet shell and filling a zone between the shell and subassembly with an insulating foam having a density substantially less than the density of said first-mentioned foam.

6. The method as set forth in claim 5, wherein said releasable holding force is applied by magnetic means positioned within said liner.

7. The method as set forth in claim 5, wherein said first-mentioned foam is applied as a foamable liquid.

8. The method as set forth in claim 7, wherein said foamable liquid is provided in a highly reactive state to permit it to be spray-applied to vertically oriented liner walls.

9. A method of assembling a refrigeration cabinet comprising the steps of providing a box-like inner liner formed of sheet metal prefinished on its interior surfaces, providing a coil of steel refrigeration tubing in a configuration adapted to be arranged on a plurality of exterior walls of the liner, assembling the coil on the exterior of the liner, drawing portions of the coil into contact with the liner walls with a magnetic field developed by means positioned within the liner, applying heat conductive mastic to the coil and liner, spraying a foamable liquid in a highly reactive state on sections of the walls engaged by the coil, allowing the liquid to foam and reach a solid state with sufficient density to permanently fasten the coils in substantially the same position as that temporarily maintained by the magnetic field without additional mechanical fastening means detrimental to the appearance of the prefinished liner interior, positioning the subassembly of the liner, tubing and foam in an outer shell, and foaming a second liquid in place to fill a zone between the shell and subassembly with an insulating foam of substantially less density than said first-mentioned foam.

* * * * *